(12) United States Patent
Ogawa et al.

(10) Patent No.: US 11,285,822 B2
(45) Date of Patent: Mar. 29, 2022

(54) ELECTRIC POWER SYSTEM AND CONTROL METHOD THEREFOR

(71) Applicant: TOYOTA JIDOSHA KABUSHIKI KAISHA, Toyota (JP)

(72) Inventors: Tomohiro Ogawa, Miyoshi (JP); Kenji Umayahara, Miyoshi (JP); Ryota Kawaguchi, Toyota (JP); Shota Okada, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 193 days.

(21) Appl. No.: 16/824,771

(22) Filed: Mar. 20, 2020

(65) Prior Publication Data

US 2020/0307396 A1 Oct. 1, 2020

(30) Foreign Application Priority Data

Mar. 27, 2019 (JP) .............................. JP2019-060931

(51) Int. Cl.
*B60L 50/75* (2019.01)
*H01M 10/42* (2006.01)
*B60W 10/08* (2006.01)

(52) U.S. Cl.
CPC .............. *B60L 50/75* (2019.02); *B60W 10/08* (2013.01); *H01M 10/4264* (2013.01); *H01M 2220/20* (2013.01)

(58) Field of Classification Search
CPC ... B60L 50/75; B60W 10/08; H01M 10/4264; H01M 2220/20
USPC .................................................. 307/9.1, 10.1
See application file for complete search history.

(56) References Cited

U.S. PATENT DOCUMENTS

2019/0193589 A1* 6/2019 Toriumi .................. B60L 58/40

FOREIGN PATENT DOCUMENTS

JP 2008084628 A 4/2008
JP 2018113825 A 7/2018

* cited by examiner

*Primary Examiner* — Hal Kaplan
(74) *Attorney, Agent, or Firm* — Dickinson Wright, PLLC

(57) ABSTRACT

An electric power system includes a secondary battery configured to supply electric power to a drive motor, configured to generate driving force of a vehicle, and an auxiliary having an auxiliary smoothing capacitor, a secondary battery relay configured to open or close an electrical contact between the secondary battery and the drive motor, a secondary battery smoothing capacitor connected between the secondary battery relay and the drive motor, an auxiliary relay configured to open or close an electrical contact between the secondary battery and the auxiliary, and a control unit configured to control a switching operation of each of the secondary battery relay and the auxiliary relay. The control unit is configured to, at startup of the vehicle, precharge the secondary battery smoothing capacitor by closing the secondary battery relay and then precharge the auxiliary smoothing capacitor by closing the auxiliary relay.

6 Claims, 3 Drawing Sheets

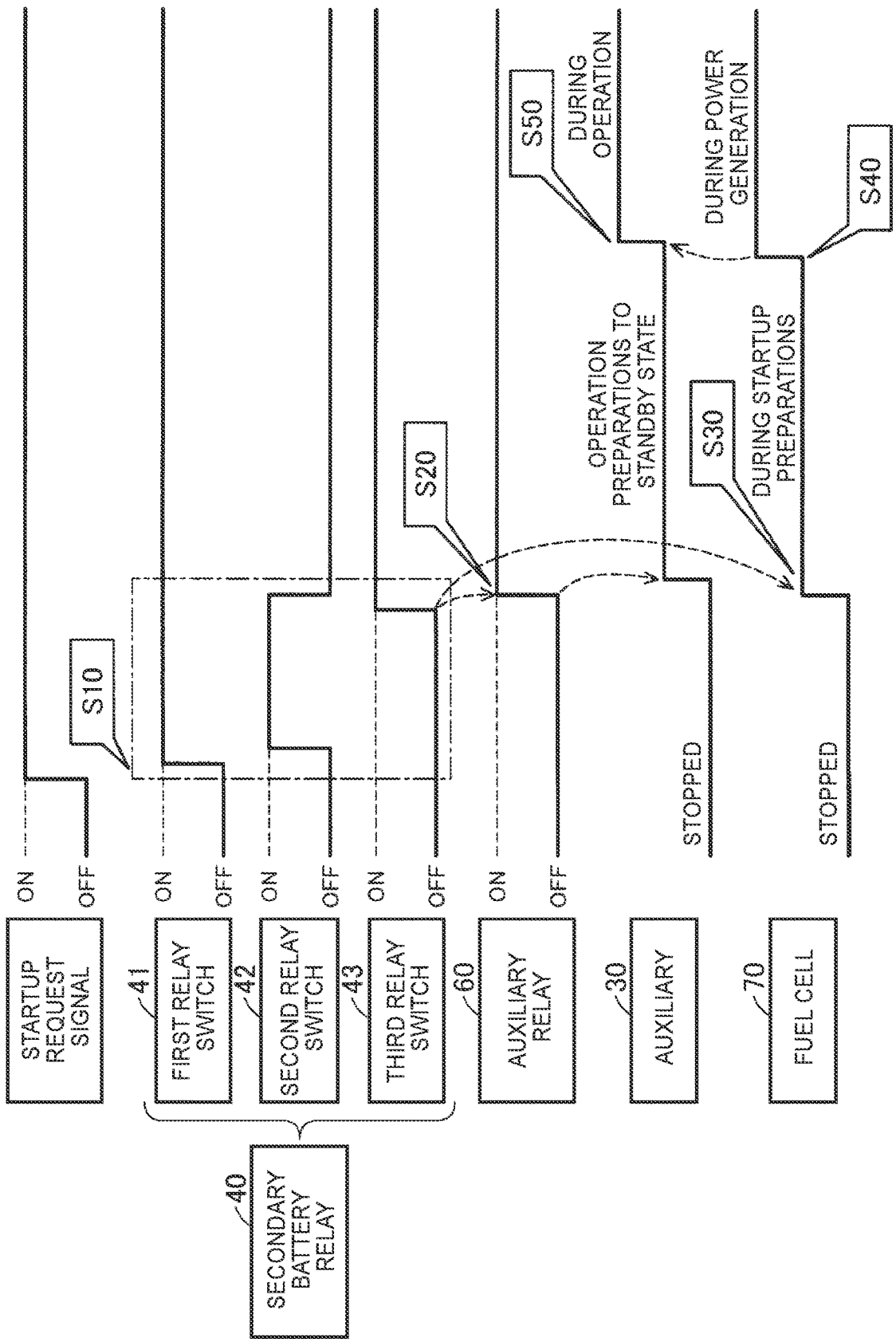

ELECTRIC POWER SYSTEM AND CONTROL METHOD THEREFOR

INCORPORATION BY REFERENCE

The disclosure of Japanese Patent Application No. 2019-060931 filed on Mar. 27, 2019 including the specification, drawings and abstract is incorporated herein by reference in its entirety.

BACKGROUND

1. Technical Field

The disclosure relates to an electric power system and a control method therefor.

2. Description of Related Art

A vehicle that uses a drive motor as a driving force source is usually equipped with an electric power system that supplies electric power to the drive motor and other various auxiliaries. For example, Japanese Unexamined Patent Application Publication No. 2008-084628 (JP 2008-084628 A) describes an electric power system that supplies electric power from a fuel cell and a secondary battery to a drive motor and auxiliaries. In the electric power system described in JP 2008-084628 A, a smoothing capacitor is connected to the secondary battery to absorb fluctuations in the output voltage of the secondary battery. In the electric power system described in JP 2008-084628 A, the smoothing capacitor for the secondary battery is precharged to reduce the flow of inrush current into the smoothing capacitor at the time of startup of the electric power system.

SUMMARY

On a vehicle equipped with the above-described electric power system, for example, an auxiliary that is driven at a high voltage of several hundreds of volts, such as a freezing machine, can be mounted. In general, a smoothing capacitor for absorbing fluctuations in voltage is also incorporated in an auxiliary that is driven at a high voltage. For this reason, when such an auxiliary is mounted on the above-described vehicle, not only the smoothing capacitor for the secondary battery but also the smoothing capacitor for the auxiliary is desirably precharged at the time of startup of the vehicle.

However, when not only the smoothing capacitor for the secondary battery but also the smoothing capacitor of the high-voltage auxiliary is precharged at the time of startup of the electric power system, the duration of precharge extends. This increases time required from when a driver makes an operation to start up the vehicle to when the drive motor can be driven. Such an inconvenience applies not only to an electric power system mounted on a fuel cell vehicle but also to an electric power system that is mounted on, for example, an electric vehicle or a hybrid vehicle and that supplies a drive motor of the vehicle with the electric power of a secondary battery.

The technology of the disclosure may be implemented as the following aspects.

A first aspect provides an electric power system mounted on a vehicle and configured to supply electric power to a drive motor, configured to generate driving force, and an auxiliary having an auxiliary smoothing capacitor. The electric power system of this aspect includes a secondary battery configured to supply electric power to the drive motor and the auxiliary, a secondary battery relay provided in a first direct current conductor connecting the drive motor and the secondary battery, the secondary battery relay being configured to open or close an electrical contact between the drive motor and the secondary battery, a secondary battery smoothing capacitor connected to the first direct current conductor between the secondary battery relay and the drive motor, an auxiliary relay provided in a second direct current conductor connected to the first direct current conductor between the secondary battery relay and the drive motor, the second direct current conductor connecting the first direct current conductor and the auxiliary, the auxiliary relay being configured to open or close an electrical contact between the secondary battery and the auxiliary, and a control unit configured to control a switching operation of each of the secondary battery relay and the auxiliary relay. The control unit is configured to, at startup of the vehicle, execute relay control for precharging the secondary battery smoothing capacitor by closing the secondary battery relay in a state where the auxiliary relay is open and then precharging the auxiliary smoothing capacitor by closing the auxiliary relay. With the electric power system of this aspect, supply of electric power from the secondary battery to the drive motor can be started before the auxiliary smoothing capacitor is precharged by connecting the secondary battery and the auxiliary with the auxiliary relay. This reduces an extension of time required until the drive motor can be driven due to precharging of the auxiliary smoothing capacitor at startup of the vehicle, so a startup time until the vehicle can travel can be reduced.

The electric power system of the above aspect may further include an electric power generator connected to the first direct current conductor via a third direct current conductor between the secondary battery smoothing capacitor and the drive motor and configured to generate electric power that is supplied to the drive motor. With the electric power system of this aspect, at least part of electric power that is supplied to the drive motor can be supplied by the electric power generator, so a load on the secondary battery that outputs electric power to both the auxiliary and the drive motor can be reduced. Thus, an auxiliary that is driven at a higher voltage can be employed, or the size of a secondary battery can be reduced.

In the electric power system of the above aspect, the control unit may be further configured to control operation of the auxiliary and, after the relay control, when power generation of the electric power generator is started, permit the operation of the auxiliary. With the electric power system of this aspect, the start of consumption of large electric power by the auxiliary before the electric power generator starts power generation can be avoided. Thus, a load of both the drive motor and the auxiliary only on the secondary battery can be avoided, so a shortage of a state of charge of the secondary battery can be minimized.

In the electric power system of the above aspect, the control unit may be further configured to, after the auxiliary relay is closed in the relay control, start preparations for startup of the electric power generator, and the control unit may be configured to, during preparations for startup of the electric power generator, perform preparations for operation of the auxiliary, including precharging of the auxiliary smoothing capacitor. With the electric power system of this aspect, the auxiliary smoothing capacitor is precharged in parallel with preparations for startup of the electric power generator, so the startup time of the electric power system can be reduced.

In the electric power system of the above aspect, the electric power generator may include a fuel cell configured to generate electric power upon supply of reaction gas. With the electric power system of this aspect, electric power that is supplied to the drive motor can be efficiently generated by the fuel cell. Thus, a load on the secondary battery can be further reduced, so sufficient electric power can be supplied from the secondary battery to the auxiliary.

A second aspect provides a control method for an electric power system mounted on a vehicle. A drive motor, configured to generate driving force of the vehicle, and an auxiliary that is used in the vehicle are connected to a secondary battery in parallel in the electric power system. The control method of this aspect includes a first step of, at startup of the vehicle, precharging a secondary battery smoothing capacitor by closing a secondary battery relay, configured to open or close an electrical contact between the secondary battery and the drive motor, in a state where an auxiliary relay configured to open or close an electrical contact between the secondary battery and the auxiliary is open, and a second step of, after the first step, precharging an auxiliary smoothing capacitor of the auxiliary by closing the auxiliary relay to connect the auxiliary smoothing capacitor and the secondary battery. With the control method of this aspect, supply of electric power from the secondary battery to the drive motor can be started before the auxiliary smoothing capacitor is precharged. This reduces an extension of time required until the drive motor can be driven due to precharging of the auxiliary smoothing capacitor at startup of the vehicle.

The technology of the disclosure may be implemented in various modes other than the electric power system or the control method therefor. For example, the technology of the disclosure may be implemented in modes, such as a vehicle on which an electric power system is mounted, a fuel cell system including an electric power system and a control method therefor, a method of starting an electric power system, a fuel cell system, or a vehicle, a method of controlling relays, a controller or computer program that implements those methods, and a non-transitory recording medium on which the computer program is recorded.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 3 is a view that illustrates an example of a timing chart in the startup process.

DETAILED DESCRIPTION OF EMBODIMENTS

1. Embodiment

Figure 1:
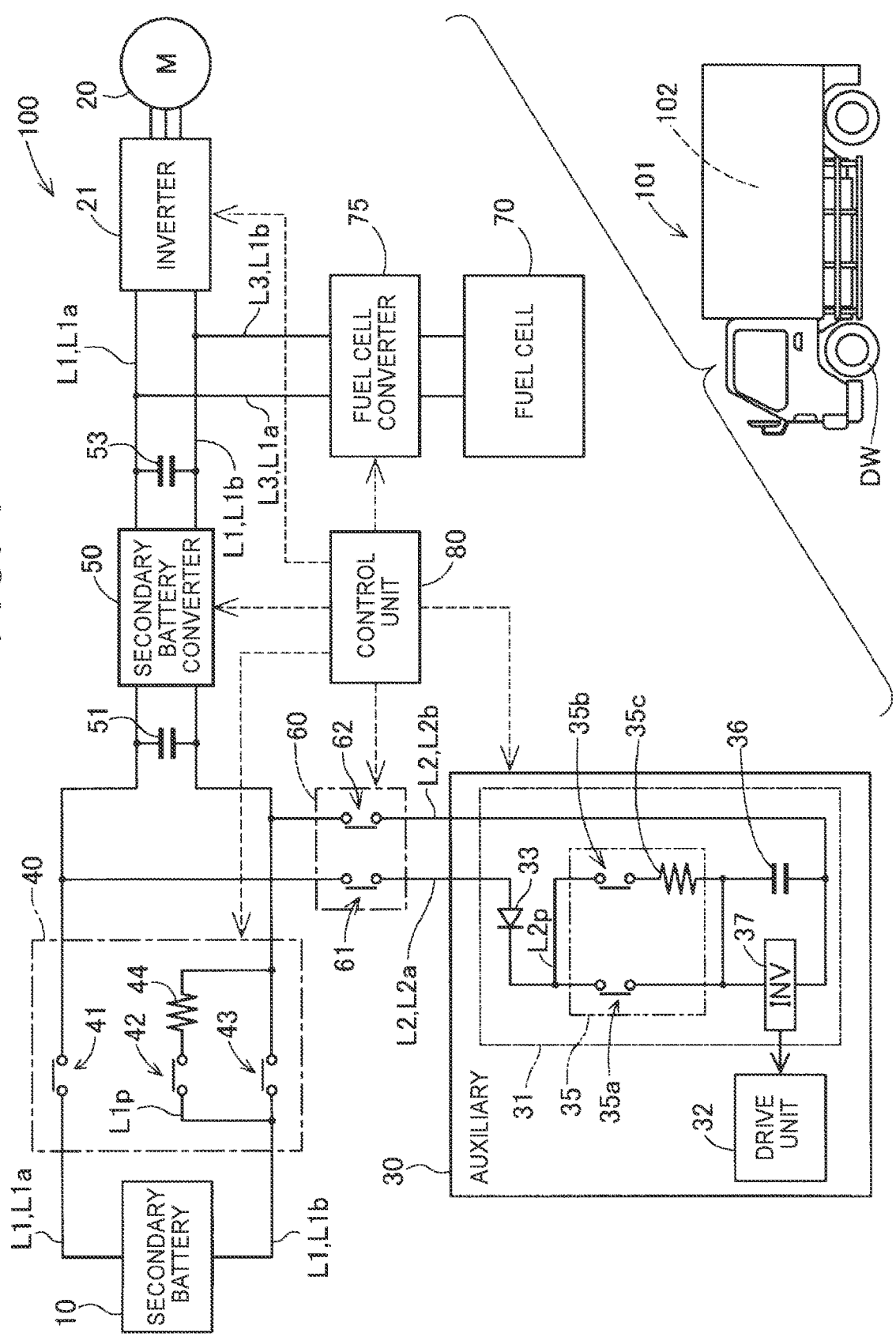
FIG. 1 is a schematic diagram of a fuel cell system mounted on a vehicle.

FIG. 1 is a schematic diagram that shows the configuration of an electric power system 100 in the present embodiment. The electric power system 100 is mounted on a vehicle 101. The electric power system 100 includes a secondary battery 10 and supplies electric power from the secondary battery 10 to a drive motor 20 and an auxiliary 30. The drive motor 20 generates driving force of the vehicle 101. The auxiliary 30 is used in the vehicle 101. The vehicle 101 of the present embodiment is a fuel cell vehicle. The drive motor 20 is operated by using not only the output power of the secondary battery 10 but also the output power of a fuel cell 70, as will be described later.

For example, a lithium ion battery is used as the secondary battery 10. The secondary battery 10 is connected to first direct current conductors L1. The first direct current conductors L1 include a first high-voltage conductor L1a and a first low-voltage conductor L1b. The first high-voltage conductor L1a is connected to the positive terminal of the secondary battery 10. The first low-voltage conductor L1b is connected to the negative terminal of the secondary battery 10. The first low-voltage conductor L1b is connected to a ground. The secondary battery 10 outputs electric power to the drive motor 20 and the auxiliary 30 through the first direct current conductors L1.

The drive motor 20 is coupled to drive wheels DW of the vehicle 101 via gears (not shown). The drive motor 20 generates driving force to rotate the drive wheels DW. The drive motor 20 is, for example, a three-phase alternating-current motor. The electric power system 100 includes an inverter 21 that mediates connection between the drive motor 20 and the first direct current conductors L1. The inverter 21 is a DC-AC inverter. The inverter 21 converts direct current flowing through the first direct current conductors L1 to three-phase alternating current and outputs the three-phase alternating current to the drive motor 20. The inverter 21 also converts regenerated electric power generated by the drive motor 20 to direct current and outputs the direct current to the first direct current conductors L1. The regenerated electric power is stored in the secondary battery 10.

The auxiliary 30 is connected to the first direct current conductors L1 via second direct current conductors L2. The second direct current conductors L2 are connected to the first direct current conductors L1 between a secondary battery relay 40 (described later) and the drive motor 20. The second direct current conductors L2 include a second high-voltage conductor L2a and a second low-voltage conductor L2b. The second high-voltage conductor L2a is connected to the first high-voltage conductor L1a of the first direct current conductors L1. The second low-voltage conductor L2b is connected to the first low-voltage conductor L1b. In the present embodiment, the second direct current conductors L2 are connected to the first direct current conductors L1 between the secondary battery relay 40 and a secondary battery smoothing capacitor 51. However, in another embodiment, the second direct current conductors L2 may be connected to the first direct current conductors L1 between the secondary battery smoothing capacitor 51 and a secondary battery converter 50.

The auxiliary 30 includes a power supply unit 31 and a drive unit 32. The power supply unit 31 is connected to the second direct current conductors L2. The drive unit 32 is driven upon supply of electric power from the power supply unit 31. The auxiliary 30 is operated at a high voltage of 100 V or higher. In the present embodiment, the auxiliary 30 is a freezing machine. The auxiliary 30 controls the temperature in a freezer 102 of the vehicle 101 to, for example, a below-freezing temperature by driving a compressor, or the like, of the drive unit 32.

The power supply unit 31 of the auxiliary 30 includes a diode 33, an internal relay 35, an auxiliary smoothing capacitor 36, and an auxiliary inverter 37. The diode 33 and the internal relay 35 are provided in the second high-voltage conductor L2a. The diode 33 prevents backflow of current from the auxiliary 30 side to the secondary battery 10 side.

The internal relay 35 is connected to the second high-voltage conductor L2a. The internal relay 35 connects or disconnects the second high-voltage conductor L2a through switching operation. The internal relay 35 includes a first internal relay switch 35a, a second internal relay switch 35b, a resistive element 35c, and an auxiliary parallel conductor L2p connected in parallel with the second high-voltage conductor L2a. The first internal relay switch 35a is provided in the second high-voltage conductor L2a. The second internal relay switch 35b is provided in the auxiliary parallel conductor L2p together with the resistive element 35c. The resistive element 35c is provided in a stage subsequent to the second internal relay switch 35b.

The auxiliary smoothing capacitor 36 is connected to the auxiliary parallel conductor L2p and the second low-voltage conductor L2b. The auxiliary smoothing capacitor 36 absorbs steep fluctuations in voltage in the power supply unit 31. The auxiliary inverter 37 is connected to the second high-voltage conductor L2a and the second low-voltage conductor L2b in a stage subsequent to the internal relay 35. The auxiliary inverter 37 converts direct current to alternating current and outputs the alternating current to the drive unit 32. As will be described later, in the electric power system 100, the auxiliary smoothing capacitor 36 of the auxiliary 30 is precharged in the startup process.

The electric power system 100 includes the secondary battery relay 40, the secondary battery converter 50, the secondary battery smoothing capacitor 51, and a motor smoothing capacitor 53 in addition to the secondary battery 10 and the inverter 21 as components connected to the first direct current conductors L1.

The secondary battery relay 40 opens or closes electrical contacts between the secondary battery 10 and each of the drive motor 20 and the auxiliary 30. The secondary battery relay 40 includes three relay switches 41, 42, 43, a relay resistive element 44, and a parallel conductor L1p connected in parallel with the first low-voltage conductor L1b. The three relay switches 41, 42, 43 each are a switching element that individually opens or closes. The first relay switch 41 is provided in the first high-voltage conductor L1a. The second relay switch 42 is provided in the parallel conductor L1p. The third relay switch 43 is provided in the first low-voltage conductor L1b. The relay resistive element 44 is provided in the parallel conductor L1p together with the second relay switch 42. The relay resistive element 44 is provided on a stage subsequent to the second relay switch 42 when viewed from the secondary battery 10 side. Switching control over the secondary battery relay 40 will be described later.

The secondary battery converter 50 is provided between the secondary battery relay 40 and the inverter 21. The secondary battery converter 50 is a step-up DC-DC converter. The secondary battery converter 50 controls the charging and discharging of the secondary battery 10. The secondary battery converter 50 steps up a voltage output from the secondary battery 10 and outputs the stepped-up voltage to the inverter 21 side. The secondary battery converter 50 stores regenerated electric power or electric power generated by the fuel cell 70, in the secondary battery 10. Regenerated electric power is generated by the drive motor 20 and converted to direct current by the inverter 21.

The secondary battery smoothing capacitor 51 is connected to the first high-voltage conductor L1a and the first low-voltage conductor L1b between the secondary battery relay 40 and the secondary battery converter 50. The secondary battery smoothing capacitor 51 absorbs steep fluctuations in voltage in a section between the secondary battery 10 and the secondary battery converter 50.

The motor smoothing capacitor 53 is connected to the first high-voltage conductor L1a and the first low-voltage conductor L1b between the secondary battery converter 50 and the inverter 21. The motor smoothing capacitor 53 absorbs steep fluctuations in voltage in a section between the secondary battery converter 50 and the inverter 21. As will be described later, in the electric power system 100, the secondary battery smoothing capacitor 51 and the motor smoothing capacitor 53 are precharged in the startup process. In another embodiment, the motor smoothing capacitor 53 may be omitted.

The electric power system 100 further includes an auxiliary relay 60. The auxiliary relay 60 is provided in the second direct current conductors L2, and opens or closes electrical contacts between the secondary battery 10 and the auxiliary 30. The auxiliary relay 60 includes a high-voltage relay switch 61 and a low-voltage relay switch 62. The high-voltage relay switch 61 is provided in the second high-voltage conductor L2a. The low-voltage relay switch 62 is provided in the second low-voltage conductor L2b. Switching control over the auxiliary relay 60 will be described later.

As described above, the electric power system 100 includes the fuel cell 70 that functions as a power supply together with the secondary battery 10, and includes a fuel cell converter 75 for controlling the output power of the fuel cell 70. The fuel cell 70 is an electric power generator that generates electric power upon supply of reaction gas from a reaction gas supply unit (not shown) mounted on the vehicle 101. In the present embodiment, the fuel cell 70 is a polymer electrolyte fuel cell. The fuel cell 70 is not limited to a polymer electrolyte fuel cell and may be, for example, any one of fuel cells of various types, such as a solid oxide fuel cell.

The fuel cell 70 is connected to the first direct current conductors L1 via third direct current conductors L3 between the motor smoothing capacitor 53 and the inverter 21. The third direct current conductors L3 include a third high-voltage conductor L3a and a third low-voltage conductor L3b. The third high-voltage conductor L3a is connected to the first high-voltage conductor L1a. The third low-voltage conductor L3b is connected to the first low-voltage conductor L1b.

The fuel cell converter 75 is provided in the third direct current conductors L3. The fuel cell converter 75 is a step-up DC-DC converter. The fuel cell converter 75 steps up the output voltage of the fuel cell 70. The output current of the fuel cell 70 is controlled by the fuel cell converter 75.

In the electric power system 100, by cooperation between the secondary battery converter 50 and the fuel cell converter 75, the output power of at least one of the secondary battery 10 and the fuel cell 70 is supplied to the drive motor 20. Power generation auxiliaries that are used to operate the fuel cell 70, such as an air compressor included in the above-described reaction gas supply unit, are also operated by using at least one of the output power of the secondary battery 10 and the output power of the fuel cell 70 as in the case of the drive motor 20.

The electric power system 100 further includes a control unit 80 that controls the electric power system 100. The control unit 80 is an electronic control unit (ECU) including at least one processor and a main storage device. The control unit 80 exercises various functions for controlling the electric power system 100 as will be described below by the at least one processor running a program or instruction loaded onto the main storage device. At least part of the functions of the control unit 80 may be made up of a hardware circuit.

The control unit 80 controls the switching operation of each of the secondary battery relay 40 and the auxiliary relay 60. The control unit 80 precharges the secondary battery smoothing capacitor 51, the motor smoothing capacitor 53, and the auxiliary smoothing capacitor 36 by connecting the secondary battery relay 40 and the auxiliary relay 60 sequentially in the startup process of the electric power system 100 (described later).

The control unit 80 manages the operation of the auxiliary 30. The control unit 80 also controls the driving of the drive motor 20 in response to an output request internally issued through driver's driving operation or autonomous control. Specifically, the control unit 80 controls a voltage that is input to the inverter 21 with the secondary battery converter 50, and controls the output current of the fuel cell 70 with the fuel cell converter 75. The control unit 80 also controls the frequency and voltage of three-phase alternating current that is supplied to the drive motor 20 with the inverter 21 to control the rotation speed and output torque of the drive motor 20. Other than the above, the control unit 80 controls the power generation status of the fuel cell 70 by controlling supply of reaction gas to the fuel cell 70 with the reaction gas supply unit (not shown).

Figure 2:
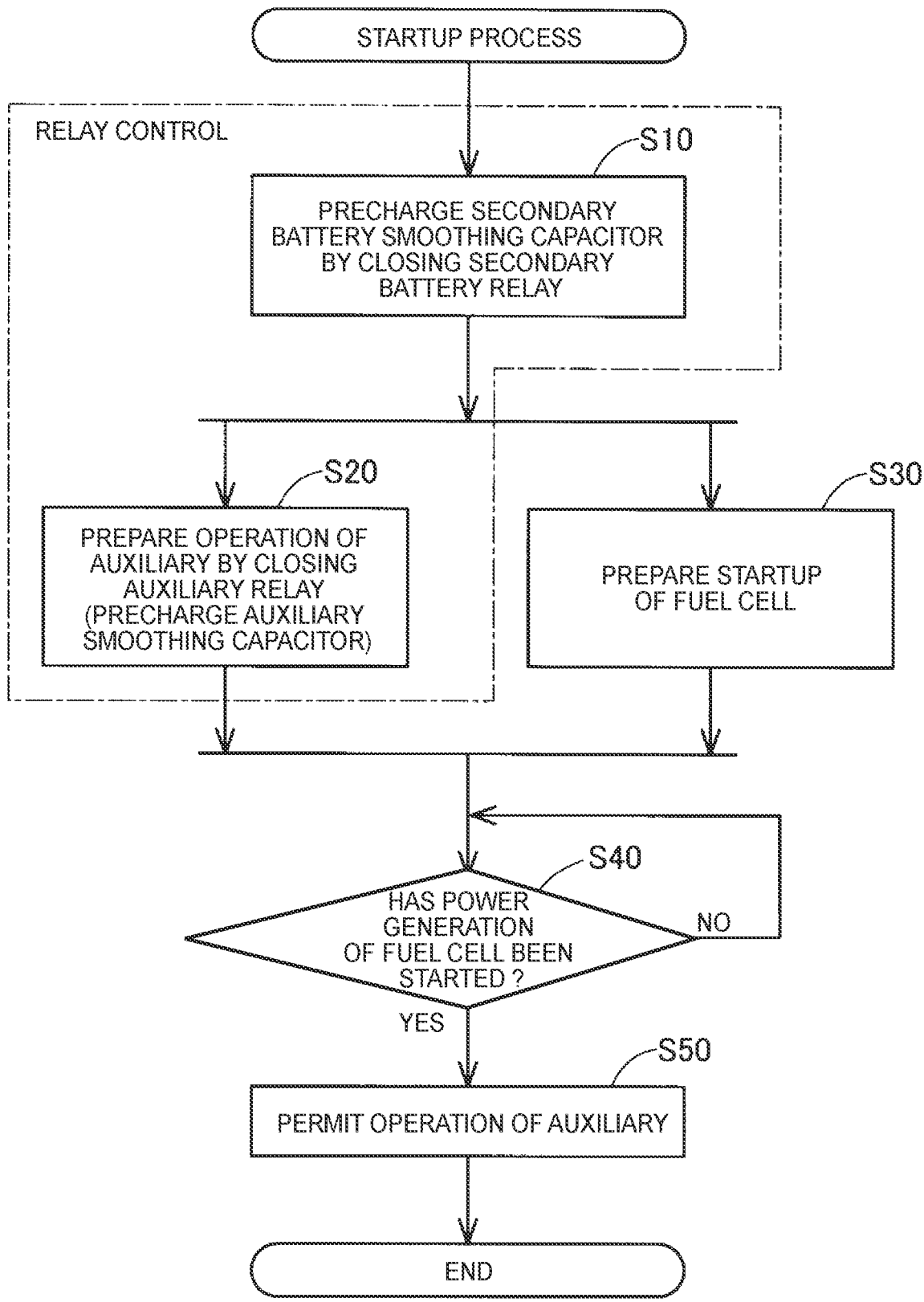
FIG. 2 is a view that illustrates the flowchart of a startup process for an electric power system.

The startup process of the electric power system 100, which is executed at startup of the vehicle 101, will be described with reference to FIG. 2 and FIG. 3 together with FIG. 1. FIG. 2 is a view that illustrates the flowchart of the startup process. FIG. 3 is a view that illustrates an example of a timing chart that represents the on/off state of a startup request signal, and the operational statuses of the secondary battery relay 40, auxiliary relay 60, auxiliary 30, and fuel cell 70 during execution of the startup process. In FIG. 3, for each relay, "ON" means a connected state where the relay is closed, and "OFF" means a disconnected state where the relay is open. FIG. 3 shows the execution timings of step S10, step S20, step S30, step S40, and step S50 shown in FIG. 2 by balloons.

The control unit 80 starts executing the startup process when the control unit 80 has detected a startup request signal for the electric power system 100. A startup request for the electric power system 100 is detected, for example, when an operation to start up the vehicle 101 is made by the driver.

In the startup process, in relay control of step S10 and step S20 that will be described below, the secondary battery relay 40 and the auxiliary relay 60 are sequentially switched from a disconnected state to a connected state. In the electric power system 100 of the present embodiment, at the time of shutdown of the system, the secondary battery relay 40, the auxiliary relay 60, and the internal relay 35 of the auxiliary 30 each are open and placed in the disconnected state.

In step S10, the control unit 80 initially precharges the secondary battery smoothing capacitor 51 by closing the secondary battery relay 40 in the following procedure while the auxiliary relay 60 remains open and placed in the disconnected state. As shown in FIG. 3, initially, the first high-voltage conductor L1a is conducted by closing the first relay switch 41 of the secondary battery relay 40. Subsequently, the parallel conductor L1p in which the relay resistive element 44 is provided is conducted by closing the second relay switch 42. Thus, the secondary battery smoothing capacitor 51 can be gradually charged by using a relatively small current limited by the relay resistive element 44. This charge is a precharge of the secondary battery smoothing capacitor 51. After a predetermined charging time by which completion of precharge of the secondary battery smoothing capacitor 51 is estimated has elapsed from when the second relay switch 42 is closed, the third relay switch 43 is closed, and the second relay switch 42 is opened. Thus, electrical connection between the secondary battery 10 and the drive motor 20 completes. When the third relay switch 43 is closed, the secondary battery smoothing capacitor 51 has been already charged, so the flow of inrush current into the secondary battery smoothing capacitor 51 is suppressed, with the result that degradation of the secondary battery smoothing capacitor 51 is reduced. The secondary battery smoothing capacitor 51 does not need to be completely charged through precharging.

In step S10, after the secondary battery smoothing capacitor 51 is precharged, the motor smoothing capacitor 53 is also precharged. The motor smoothing capacitor 53, as well as the secondary battery smoothing capacitor 51, does not need to be completely charged through precharging. Through step S10, the secondary battery 10 and the drive motor 20 are electrically connected, so electric power can be supplied from the secondary battery 10 to the drive motor 20, with the result that the vehicle 101 is able to travel by using only the electric power of the secondary battery 10. The control unit 80 may inform the driver through a notification unit (not shown) that the vehicle 101 is able to start moving.

Incidentally, before execution of step S10, the control unit 80 may execute the process of detecting occurrence of contact sticking of the secondary battery relay 40. Contact sticking can be detected by measuring a voltage between both ends of the secondary battery smoothing capacitor 51 with a voltage measuring unit (not shown) at the time when the second relay switch 42 is closed while the first relay switch 41 and the third relay switch 43 remain open. The control unit 80 determines that contacts are stuck when the measured voltage exceeds a predetermined threshold. In this case, the startup process is stopped, and the driver is warned of occurrence of contact sticking of the secondary battery relay 40 through the notification unit (not shown). When the measured voltage is less than or equal to a threshold, the control unit 80 determines that there is no contact sticking, the second relay switch 42 is opened, and the process of step S10 is started.

After step S10, step S20 and step S30 are executed in parallel. In step S20, the control unit 80 electrically connects the secondary battery 10 and the power supply unit 31 of the auxiliary 30 by closing the auxiliary relay 60 and starts preparations for operation of the auxiliary 30. Preparations for operation of the auxiliary 30 include precharging the auxiliary smoothing capacitor 36. The control unit 80 initially precharges the auxiliary smoothing capacitor 36 by controlling the switching operation of the internal relay 35. The control unit 80 precharges the auxiliary smoothing capacitor 36 by closing the second internal relay switch 35b of the auxiliary parallel conductor L2p in a state where the first internal relay switch 35a is open. Since the resistive element 35c is provided in the auxiliary parallel conductor L2p, as in the case of the above-described precharge of the secondary battery smoothing capacitor 51, the auxiliary smoothing capacitor 36 can be gradually charged. After a predetermined charging time by which completion of precharge of the auxiliary smoothing capacitor 36 is estimated has elapsed, the control unit 80 closes the first internal relay switch 35a and opens the second internal relay switch 35b. The auxiliary smoothing capacitor 36, as well as the secondary battery smoothing capacitor 51 or the motor smoothing capacitor 53, does not need to be completely charged through precharging. Through execution of step S20, supply of electric power from the secondary battery 10 to the auxiliary inverter 37 is started, and supply of electric power from the power supply unit 31 to the drive unit 32 is enabled. The control unit 80 prepares startup of electrical devices, such as the compressor included in the drive unit 32.

In step S30, the control unit 80 starts startup preparations for starting power generation of the fuel cell 70 by using the electric power of the secondary battery 10. The control unit 80, for example, starts up the reaction gas supply unit by using the electric power of the secondary battery 10. As described above, step S30 is executed in parallel with step S20, the auxiliary smoothing capacitor 36 is precharged in step S20 while preparations for startup of the fuel cell 70 are being made in step S30.

After preparations for operation of the auxiliary 30 in step S20 and preparations for startup of the fuel cell 70 in step S30 are started, the control unit 80 determines in step S40 whether power generation of the fuel cell 70 has been started. The control unit 80 waits until power generation of the fuel cell 70 is started. During waiting, even when preparations for operation of the auxiliary 30 completes and the auxiliary 30 can be operated, the auxiliary 30 is in a standby state where the auxiliary 30 is waiting without starting operation because the control unit 80 has not permitted the operation of the auxiliary 30.

When the control unit 80 detects the start of power generation of the fuel cell 70, the control unit 80 sends an instruction to the auxiliary 30 to permit the operation of the auxiliary 30 in step S50. When the auxiliary 30 receives the instruction to permit the operation of the auxiliary 30, the auxiliary 30 starts driving the drive unit 32. Thus, freezing is started in the freezer 102 of the vehicle 101. In this way, the startup process of the electric power system 100 completes.

As described above, in the electric power system 100 of the present embodiment, in the startup process at startup of the vehicle 101, the secondary battery smoothing capacitor 51 is precharged by closing the secondary battery relay 40, and then the auxiliary smoothing capacitor 36 is precharged by closing the auxiliary relay 60. Thus, before precharging of the auxiliary smoothing capacitor 36 is started, the drive motor 20 is placed such that the drive motor 20 can be driven with the electric power of the secondary battery 10. This reduces an extension of time required until the drive motor 20 can be driven due to time required for precharging of the auxiliary smoothing capacitor 36 at startup of the vehicle 101. In addition, a startup time required from when the driver makes an operation to start up the vehicle 101 to when the vehicle 101 can travel can be reduced.

In the electric power system 100 of the present embodiment, during startup preparations for starting power generation of the fuel cell 70, preparations for operation of the auxiliary 30, including precharging of the auxiliary smoothing capacitor 36, are made in parallel. This reduces an extension of startup time of the electric power system 100 due to time required for precharging of the auxiliary smoothing capacitor 36. In addition, the startup time of the electric power system 100 can be reduced.

In the electric power system 100 of the present embodiment, the control unit 80 permits the operation of the auxiliary 30 after power generation of the fuel cell 70 is started. Thus, after the electric power of the fuel cell 70 is allowed to be used to drive the drive motor 20, full-scale electric power consumption in the auxiliary 30 is started. Therefore, supplying large electric power to both the drive motor 20 and the auxiliary 30 from only the secondary battery 10 is avoided. Thus, a shortage of electric power for charging the secondary battery 10 is avoided.

In the electric power system 100 of the present embodiment, the fuel cell 70 is provided as the electric power generator that supplies electric power to the drive motor 20 together with the secondary battery 10. The fuel cell 70 is able to efficiently generate large electric power for driving the drive motor 20, so a load on the secondary battery 10 can be reduced as compared to when another electric power generator is used. Thus, the auxiliary 30 that is operated at a higher voltage can be mounted on the vehicle 101, and the size of the secondary battery 10 can be reduced.

2. Alternative Embodiments

Various components described in the above embodiments may be, for example, modified as follows. Any other embodiments that will be described below, as well as the above-described embodiments, is an example of a mode for carrying out the technology of the disclosure.

First Alternative Embodiment

In the above-described embodiments, the electric power system 100 may include an electric power generator other than the fuel cell 70, instead of the fuel cell 70. The electric power system 100 may include, for example, a power generator that generates electric power by using an internal combustion engine, or a solar panel as the electric power generator that generates electric power that is supplied to the drive motor 20. Alternatively, the electric power system 100 does not need to include such an electric power generator, and may be configured to drive the drive motor 20 and the auxiliary 30 with only the electric power of the secondary battery 10 charged through external power supply. In the startup process of the electric power system 100, step S30 and step S40 may be omitted.

Second Alternative Embodiment

In the above-described embodiments, the auxiliary 30 need not be a freezing machine. The auxiliary 30 may be any other various apparatuses that are operated at a high voltage and may be, for example, heavy equipment, such as a crane truck. The electric power system 100 may be connected to a plurality of the auxiliaries 30.

Third Alternative Embodiment

In the above-described embodiments, the motor smoothing capacitor 53, the inverter 21, or the secondary battery converter 50 may be omitted. In the above-described embodiments, the drive motor 20 and the auxiliary 30 may be included in the components of the electric power system 100.

3. Others

In the above-described embodiments, part or all of the functions and processes implemented by software may be implemented by hardware. In addition, part or all of the functions and processes implemented by hardware may be implemented by software. Various circuits, such as an integrated circuit, a discrete circuit, and a circuit module that is a combination of those circuits, may be used as hardware.

The technology of the disclosure is not limited to the above-described embodiments and alternative embodiments and may be implemented in various modes without departing from the purport of the disclosure. For example, the technical characteristics in the embodiments and alternative embodiments, corresponding to the technical characteristics in the aspects described in SUMMARY, may be replaced or combined as needed to solve part or all of the above-described inconvenience or to achieve part or all of the above-described advantageous effects. Not only the technical characteristics described as being not indispensable in the specification but also the technical characteristics not described as being indispensable in the specification may be deleted as needed.

What is claimed is:

1. An electric power system mounted on a vehicle, the electric power system being configured to supply electric power to a drive motor and an auxiliary, the drive motor being configured to generate driving force, the auxiliary including an auxiliary smoothing capacitor, the electric power system comprising:
   a secondary battery configured to supply electric power to the drive motor and the auxiliary;
   a secondary battery relay provided in a first direct current conductor connecting the drive motor and the secondary battery, the secondary battery relay being configured to open or close an electrical contact between the drive motor and the secondary battery;
   a secondary battery smoothing capacitor connected to the first direct current conductor between the secondary battery relay and the drive motor;
   an auxiliary relay provided in a second direct current conductor connected to the first direct current conductor between the secondary battery relay and the drive motor, the second direct current conductor connecting the first direct current conductor and the auxiliary, the auxiliary relay being configured to open or close an electrical contact between the secondary battery and the auxiliary; and
   a control unit configured to control a switching operation of each of the secondary battery relay and the auxiliary relay, the control unit being configured to, at startup of the vehicle, execute relay control for precharging the secondary battery smoothing capacitor by closing the secondary battery relay in a state where the auxiliary relay is open and then precharging the auxiliary smoothing capacitor by closing the auxiliary relay.

2. The electric power system according to claim 1, further comprising an electric power generator connected to the first direct current conductor via a third direct current conductor between the secondary battery smoothing capacitor and the drive motor, the electric power generator being configured to generate electric power that is supplied to the drive motor.

3. The electric power system according to claim 2, wherein:
   the control unit is further configured to control operation of the auxiliary; and
   the control unit is configured to, after the relay control, when power generation of the electric power generator is started, permit the operation of the auxiliary.

4. The electric power system according to claim 2, wherein:
   the control unit is further configured to, after the auxiliary relay is closed in the relay control, start preparations for startup of the electric power generator; and
   the control unit is configured to, during preparations for startup of the electric power generator, perform preparations for operation of the auxiliary, including precharging of the auxiliary smoothing capacitor.

5. The electric power system according to claim 2, wherein the electric power generator includes a fuel cell configured to generate electric power upon supply of reaction gas.

6. A control method for an electric power system mounted on a vehicle, a drive motor and an auxiliary being connected to a secondary battery in parallel in the electric power system, the drive motor being configured to generate driving force of the vehicle, the auxiliary being used in the vehicle, the control method comprising:
   a first step of, at startup of the vehicle, precharging a secondary battery smoothing capacitor by closing a secondary battery relay, configured to open or close an electrical contact between the secondary battery and the drive motor, to connect the secondary battery and the secondary battery smoothing capacitor in a state where an auxiliary relay, configured to open or close an electrical contact between the secondary battery and the auxiliary, is open; and
   a second step of, after the first step, precharging an auxiliary smoothing capacitor of the auxiliary by closing the auxiliary relay to connect the auxiliary smoothing capacitor and the secondary battery.

* * * * *